(12) United States Patent
Armitage

(10) Patent No.: US 6,762,982 B2
(45) Date of Patent: Jul. 13, 2004

(54) APPARATUS AND METHOD OF INTERRUPT DETECTION IN AN OPTICAL DISC ENVIRONMENT

(75) Inventor: Philip J. Armitage, Manchester (GB)

(73) Assignee: LSI Logic Corporation, Milpitas, CA (US)

( * ) Notice: Subject to any disclaimer, the term of this patent is extended or adjusted under 35 U.S.C. 154(b) by 520 days.

(21) Appl. No.: 09/863,744

(22) Filed: May 23, 2001

(65) Prior Publication Data

US 2002/0093894 A1 Jul. 18, 2002

(51) Int. Cl.$^7$ ................................................ G11B 7/00
(52) U.S. Cl. ................ 369/47.25; 369/369; 369/59.15; 369/53.37
(58) Field of Search ........................ 369/47.25, 47.22, 369/47.27, 44.28, 59.15, 53.12, 53.15, 53.37, 53.17

(56) References Cited

U.S. PATENT DOCUMENTS

| | | | | |
|---|---|---|---|---|
| 6,154,429 A | * | 11/2000 | Grimm | 369/59.18 |
| 6,282,157 B1 | * | 8/2001 | Kim et al. | 369/44.35 |
| 6,295,254 B1 | * | 9/2001 | Tomishima | 369/44.28 |
| 6,366,549 B1 | * | 4/2002 | Lee et al. | 369/112.05 |

* cited by examiner

Primary Examiner—Nabil Hindi
(74) Attorney, Agent, or Firm—Christopher P. Maiorana, P.C.

(57) ABSTRACT

A method of determining interrupts in data on an optical disc, the data supported in a signal envelope subject to variation by mirror modulation and said interrupts. The method comprises the steps of (A) filtering the signal envelope to generate a first signal; (B) re-biasing the first signal to produce an intermediate signal having voltage swings attributable to the mirror modulation; (C) defining a slice level below a reference level to sample the mirror modulation to produce a mirror signal; (D) slicing the intermediate signal to generate the mirror signal containing a pulse resulting from a level transition through the slice level associated with re-biasing of the positive transition component; and (E) registering the presence of the pulse during the on-track mode of operation to identify the interrupt in data on the optical disc.

19 Claims, 4 Drawing Sheets

APPARATUS AND METHOD OF INTERRUPT DETECTION IN AN OPTICAL DISC ENVIRONMENT

This application claims the benefit of United Kingdom Application No. 0029120.3 filed Nov. 29, 2000.

BACKGROUND OF THE INVENTION

This invention relates, in general, to a mechanism and apparatus for coherently recovering and interpreting data from an optical disc, such as a digital versatile disc read only memory (DVD-ROM) and more particularly, to an apparatus and/or method that operates to suspend data recovery and circuit operation in response to identification of regions of maximum reflectivity in the optical media that adversely affect recovery of modulated data.

BACKGROUND OF THE INVENTION

With respect to the storage of data on optical storage media, such as on compact disc read only memory (CD-ROM) and DVD-RAM, a selected form of modulation encodes data into the surface of the media. In the context of DVD-ROM or DVD-RAM, an eight-fourteen modulation (EFM) scheme is used to encode binary data through the use of data "pits" that are either magnetically or optically inscribed within, or manually embossed/stamped on the surface of the optical storage medium and undisturbed mirror regions. The length of the pit or complementary mirror is therefore indicative of the encoded binary information, subject to there being no defects associated with the formation of the pit or mirror.

The structure of data segments (or sectors) on an optical storage medium spiral outwardly from a center of the optical storage medium. The data segments are also indexed through the use of a header that is embossed (i.e., physically stamped) onto the surface of the optical storage medium, thus providing address and location information, such as track and sector numbers. The headers are individually indexed at the beginning of the disc for use in scanning. The headers have a precisely defined width dimension and are separated by a data sector of defined length.

From a perspective of data recovery, an on-track array of (typically) four photodiodes is used to recover the information stored on the medium. The four photodiodes provide an output current that varies according to an amount of reflectivity from the surface of the medium. More particularly, laser light is reflected from the marks and spaces with a data pit (i.e., a mark) providing an inferior reflectivity and hence a lower current than a space (that provides maximum reflectivity and hence maximum current). Essentially, with respect to data pits, destructive interference at the photodiode is generally indicative of the EFM modulation (in the exemplary instance of DVDs and CDs). The array is conventionally in the form of a 4-quadrant photodiode array in which a sum of the individual currents from the photodiodes is used to extract EFM data. More specifically, the four currents from the photodiode are converted to voltages in a pre-amplifier in a pick-up assembly before being presented to a read channel. The variation in the reflected laser light levels results in voltage signals of varying magnitude and duration (RF data), which are processed by the read channel to produce raw binary data.

When reading data from CD and DVD ROM discs, it is necessary to detect regions of the disc that contain defects. These regions take two forms: areas where the reflectivity of the disc is greatly reduced (defects), and areas where the data region is at maximum reflectivity (interrupts). Detection of the defective regions is necessary in order to perform certain holding and corrective functions in the player/recorder to maintain the data channel (principally the read channel) in a stable state during such defective regions. For example, at detection of a defect, data recovery, the phase lock loop and/or the tracking servo can be frozen. Failure to detect a defect otherwise results in the loss of coherent data in that particular region of defect. For example, once the device is on-track then the device should, ideally, be held on-track to avoid having to instigate a full recovery action for coherent data recovery. However, movement of the head pick-up will occur. During such cases, minimized disruption is desirable.

Furthermore, the ability to resolve mirror (i.e., high reflectivity) regions is important in the context of device operation since mirror regions inherently exist between adjacent tracks of an optical disc. Consequently, monitoring of the photodiode output during a track seek or jump mode where a read/write head (or pick-up assembly) moves radially across multiple contiguous tracks results in a sinusoidal modulation of the envelope of the RF data (known as the mirror signal or mirror modulation). Such mirror modulation is used to extract a mirror component that controls radial servo movement since the sinusoidal oscillation can be used to determine radial distance, location and relative movement between tracks by counting periods in the mirror signal. In contrast with read (RF) data on-track (which has a frequency of several megahertz), mirror modulation during track transition has a relatively low frequency of about 100 kilohertz. Defects, in general, can have an effect of corrupting a mirror modulation signal, with the defect causing de-focusing of the laser (at the photodiode) to the so-called "dark level", whereas interrupts generate spurious mirror signals. In other words, the defect takes the recovered signal components below a read frequency envelope/threshold associated with a data pit.

Methods for detecting low reflectivity defect regions are well documented and readily available in CD and DVD Read Channel integrated circuits. However, the issue of interrupts is not presently addressed in systems even though such interrupts potentially have the same detrimental effects on data recovery effects and device operation.

SUMMARY OF THE INVENTION

One aspect of the present invention concerns a method of determining interrupts in data on an optical disc, the data supported in a signal envelope subject to variation by mirror modulation and said interrupts. The method comprises the steps of (A) filtering the signal envelope to generate a first signal; (B) re-biasing the first signal to produce an intermediate signal having voltage swings attributable to the mirror modulation; (C) defining a slice level below a reference level to sample the mirror modulation to produce a mirror signal; (D) slicing the intermediate signal to generate the mirror signal containing a pulse resulting from a level transition through the slice level associated with re-biasing of the positive transition component; and (E) registering the presence of the pulse during the on-track mode of operation to identify the interrupt in data on the optical disc.

The objects, features and advantages of the present invention include providing a system that reliably detects both defects and interrupts in an optical disc media, and then operates to minimize damage to data recovery caused by such defects and interrupts.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
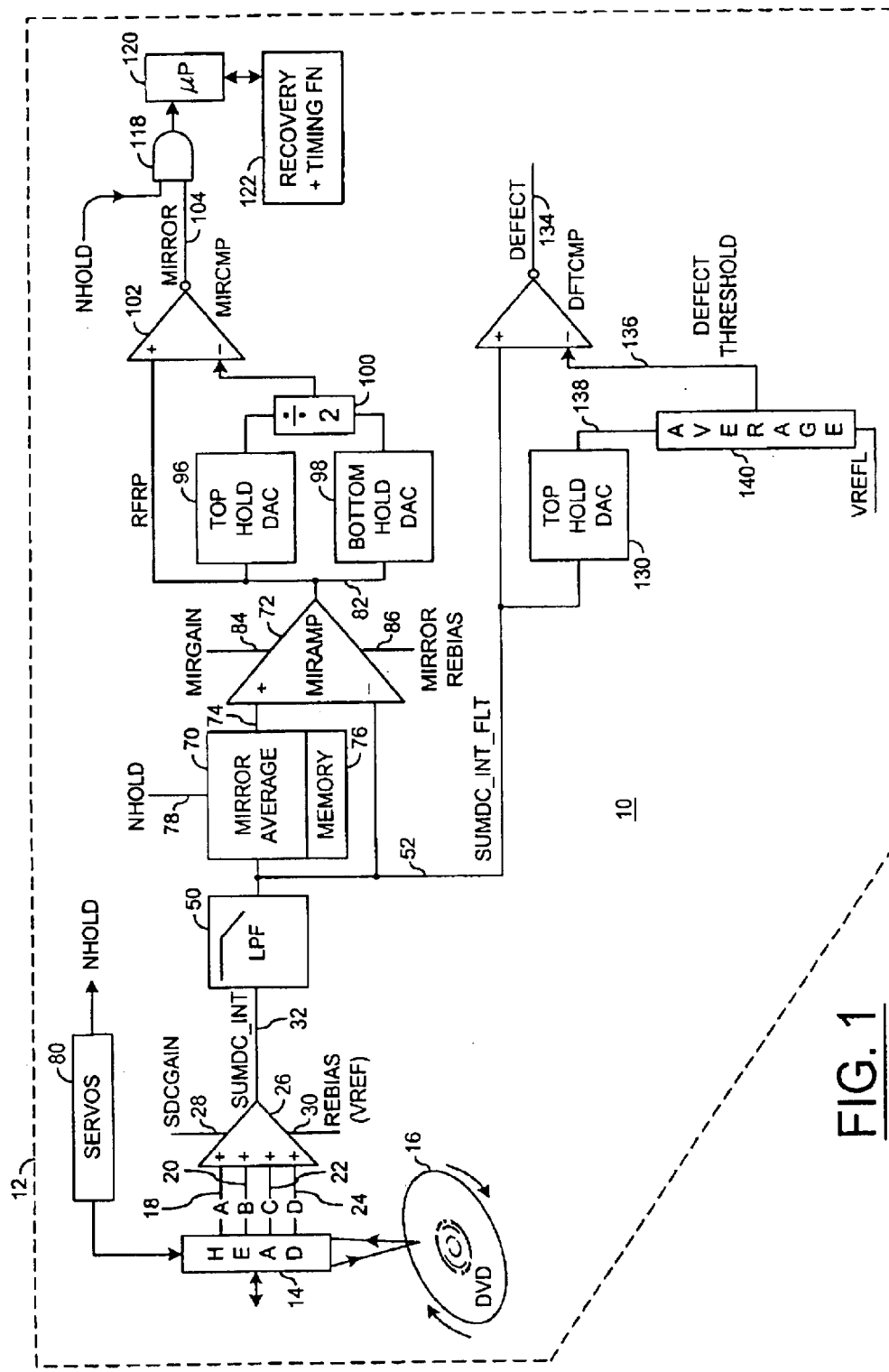
FIG. 1 is a schematic block diagram of a defect and interrupt detection circuit according to a preferred embodiment of the present invention shown in situ within an optical disc device.

In the optical disc system of one embodiment of the present invention, recovery of data is generally corrupted by defect and interrupt regions (e.g., areas in the optical disc media that support minimum and maximum reflectivity inconsistent with an encoded modulation scheme). A low-pass filtered signal (e.g., SUMDC_INT_FLT) of a summed representation of a recovered data stream therefore has a DC offset relative to a re-biased dark level. The DC offset is representative of an on-track data region. Additionally, the signal SUMDC_INT_FLT is subject to mirror modulation during track seeking/jumping modes of operation, where the signal SUMDC_INT_FLT fluxuates in amplitude relative to the DC offset. The signal SUMDC_INT_FLT is inverted in an intermediate signal (e.g., RFRP) in which a voltage swing attributable to the mirror modulation and voltage transitions caused by interrupts are always below a reference level. The intermediate signal RFRP is sampled to produce a mirror signal. To differentiate from interrupts and the mirror modulation in the mirror signal, the mirror signal is logically ANDed with a system flag (e.g., NHOLD) indicative of on-track or seek/jump modes of operation. Interrupts are therefore identified by interrupt pulses resulting from the logical operation, with a system processor able to suspend selected system functions to mitigate the effects caused by interrupts on system operation.

According to a first aspect of the present invention there is provided a method of determining interrupts in data on an optical disc, the data being supported in a signal envelope that is subject to variation by mirror modulation and said interrupts, comprising the steps of (A) filtering the signal envelope to generate, over time, a first signal having (i) a DC offset component representative of on-track data, (ii) an oscillation component representative of the mirror modulation, where the oscillation component provides variations in level from the DC offset component and (iii) a positive transition component relative to the DC offset component, the positive transition component attributable to an interrupt; (B) re-biasing the first signal to produce an intermediate signal having voltage swings attributable to the mirror modulation and said interrupts are below a reference level associated with the DC offset component; (C) defining a slice level below the reference level to sample the mirror modulation to produce a mirror signal; (D) slicing the intermediate signal with respect to the slice level to generate the mirror signal containing, over time and during an on-track mode of operation, a pulse resulting from a level transition through the slice level associated with re-biasing of the positive transition component; and (E) registering the presence of the pulse during the on-track mode of operation to identify the interrupt in data on the optical disc.

In one example, the method includes setting an operational flag indicative of one of the on-track mode of operation and a jump/seek mode of operation; and logically combining the operational flag with the mirror signal to generate an interrupt pulse. This method may further comprise, in response to identification of the presence of the interrupt, suspending at least one system function of an optical media device. The first signal is preferably a low-pass filtered version of the signal envelope. In a particular embodiment, the method also includes holding an averaged DC level for the signal envelope during periods of track seeking and track jumping, the averaged DC level being the DC offset component.

In another embodiment, the method further comprises: applying the first signal to an amplifier having a variable gain; applying the DC offset component to the amplifier; and dynamically varying the gain of the amplifier relative to a DC mirror re-bias level to produce the intermediate signal, causing repositioning of the intermediate signal within the signal envelope. The DC offset component is representative of the on-track data region and the DC offset component is relative to a re-biased dark level. The re-biased dark level and the DC mirror re-bias level are indicative of an operating range of an ADC. The intermediate signal, during on-track operation, substantially sits at the DC mirror re-bias level.

In another aspect of the present invention provides a method of suspending system operation in optical disc equipment during periods of substantially maximum reflectivity in an optical disc, the method comprising: generating a pulse during periods of substantially maximum reflectivity; associating any pulse generated during periods of on-track operation with a corruption in data recovery caused by an interrupt; and suspending at least one operational function in the optical disc equipment in response to the interrupt.

In a particular embodiment, the method may further comprise: generating a first signal level associated with data recovery during on-track operation; during track transition across adjacent tracks of the optical disc, generating an oscillation signal having a varying signal level relative to the first signal level; and generating the pulse in response to a signal level displacement relative to the first signal level, the signal level displacement being greater than the varying signal level of the oscillation signal.

In a particular embodiment, the signal level displacement has a greater magnitude than a peak-to-peak magnitude of the oscillation signal. In another arrangement, the interrupt causes a negative deflection to a level significantly below a minimum level experienced in the oscillation signal.

In a further aspect of the present invention there is provided a data recovery circuit for optically modulated data comprising: means for generating a pulse during periods of substantially maximum reflectivity; means for associating any pulse generated during periods of on-track operation with a corruption in data recovery caused by an interrupt; and means for suspending at least one operational function in the optical disc equipment in response to the interrupt.

The circuit may further comprise: means for generating a first signal level associated with data recovery during on-track operation; means for generating, during track transition across adjacent tracks of the optical disc, an oscillation signal having a varying signal level relative to the first signal level; and means for generating the pulse in response to a signal level displacement relative to the first signal level, the signal level displacement being greater than the varying signal level of the oscillation signal.

Another aspect of the present invention comprises an apparatus arranged to determine interrupts in data on an optical disc, the data being supported in a signal envelope that is subject to variation by mirror modulation and said interrupts. The apparatus comprises a filter responsive, in use, to the signal envelope, providing, in use and over time, a first signal having (i) a DC offset component representative of on-track data; (ii) an oscillation component representative of the mirror modulation, providing variations in level from the DC offset component; and (iii) a positive transition component relative to the DC offset component. The positive transition component may be attributable to an interrupt. A differential amplifier may be coupled to the filter and supporting, in use, re-biasing of the first signal to an intermediate signal having voltage swings attributable to the mirror modulation and where the interrupts are below a reference level associated with the DC offset component. A slicing circuit may be coupled to the differential amplifier and configured to have a slice level below the reference level. The slicing circuit may sample, in use, the mirror modulation to produce a mirror signal. A comparator may be coupled to the filter. The comparator may be arranged to slice the intermediate signal with respect to the slice level to generate, overtime and during on-track operation, a pulse resulting from a level transition through the slice level associated with re-biasing of the positive transition component. A processor may be arranged to identify the interrupt in data on the optical disc in response to on-track operation of the apparatus and receipt of the pulse.

The processor may include means for setting an operational flag indicative of one of the on-track mode of operation and a jump/seek mode of operation. The apparatus may further include a logic circuit configured to combine the operational flag with the mirror signal to generate an interrupt pulse. The processor, in response to identification of a presence of the interrupt, is preferably arranged to suspend at least one system function of an optical media device.

In one embodiment, the apparatus further comprises an averaging circuit coupled to the filter and the differential amplifier, the averaging circuit responsive to the first signal and arranged to provide a mirror averaged signal to the differential amplifier during periods of track seeking and track jumping. The differential amplifier preferably has a variable gain and has a first input response to the first signal and a second input responsive to the DC offset component, the differential amplifier operational dynamically to vary the gain relative to a DC mirror re-bias level to produce the intermediate signal.

Beneficially, the physical architecture of the present invention is based on a modified version of existing hardware (and computer code) that is used to identify and react to defects (i.e., areas of low reflectivity) in an optical disc. Consequently, the present invention may be incorporated into existing systems through a software upgrade, since the present invention principally relies on signal processing techniques. Indeed, the present invention can be implemented without significantly increasing manufacturing cost, whereas superior system operation performance and device robustness is attained through use of the concepts underlying the preferred embodiments of the present invention.

Referring to FIG. 1, a schematic block diagram of a defect and interrupt detection circuit 10 according to a preferred embodiment of the present invention is shown. The circuit 10 is shown within an optical disc device 12, such as a DVD-player or CD read-write machine. The optical disc device may contain a head assembly 14 supporting a four-quadrant photodiode array for recovering optically modulated data from an optical disc 16. Four resultant photodiode voltages 18–24 are applied to an amplifier 26 operationally responsive to a gain control signal (e.g., SDCGain) 28 that is set relative to a re-biased dark level (e.g., VREFL) reference signal 30 indicative of a voltage associated with a dark level region generally containing unrecoverable data in a defect region. A composite (or summed) output voltage (e.g., SUMDC_INT) 32 from the amplifier 26 has a general bounded characteristic that produces a read frequency (RF) envelope 34 displaced above (i.e. biased to) the VREFL (dark) level 30. When no light shines on the photodiodes, the signal SUMDC_INT will sit at the dark level of VREFL 30. The RF envelope 34 can be best seen in relation to FIG. 2a, in which variations of voltage amplitude are indicative of recovery of optically stored data, such as EFM data on a DVD.

Figure 2:
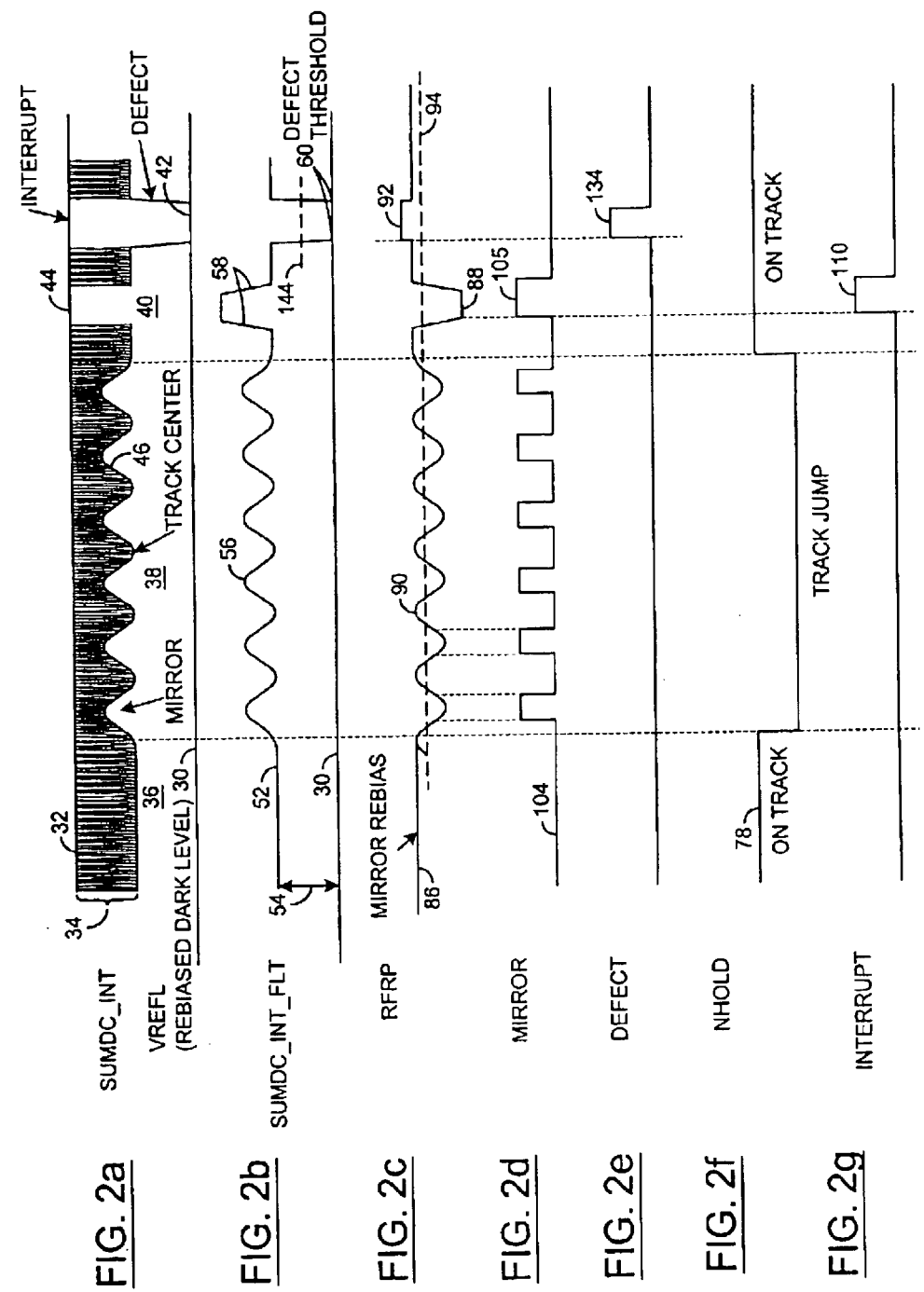
FIG. 2 is an annotated diagram illustrating inter-relationships between various signals produced during operation of the circuit of FIG. 1.

Referring to FIG. 2a, the signal profile of the RF envelope 34 of the signal SUMDC_INT 32 is shown in three particular states (i) an on-track state 36 in which there is recoverable data; (ii) a track scanning state 38; and (iii) an on-track state 40 in which defects 42 and interrupts 44 are present. During track transition (e.g., radial movement of the head assembly 14 across the optical disc 16) a lower edge of the RF envelope 34 is modulated by the mirror regions between tracks resulting in a sinusoidal edge 46 to the RF envelope. The sinusoidal edge generally comprises the mirror signal. The sinusoidal edge 46 modulates a level of reflectivity relative to a maximum voltage associated with a mirror region. Therefore, the mirror modulation only appears on a lower edge of the RF envelope 34. During periods of the interrupt 44, the data signal may be entirely lost and the signal SUM_DC_INT returns to the maximum reflectivity level determined by the head arrangement causing a maximum voltage output for the duration of the interrupt 44. Conversely, during periods of the defect 42, the voltage output of the signal SUMDC_INT signal 34 reverts to the dark level of VREFL 30 and the RF envelope is lost for the duration of the defect. Minima in the sinusoidal edge 46 of the RF envelope 34 correspond to the center of "off track" mirror regions, and maxima in the sinusoidal edge 46 correspond to the center of each track while track jumping. Some variable gain in the amplifier 26 allows a reasonable swing to be set.

In terms of the mirror modulation, while the detailed description refers to a sinusoidal edge, it will be understood that the mirror modulation may take other forms and is generally more triangular in nature. Consequently, the term "sinusoidal" should not be considered as limiting but merely descriptive of how mirror modulation affects the RF envelope 34. It should be appreciated that mirror modulation can approach about 90% of the RF envelope 34.

Returning to FIG. 1, the signal SUMDC_INT is generally applied to a low pass filter (LPF) 50 to remove the RF data but to retain relatively low frequency variations within the RF envelope 34. The low pass filtering produces a filtered signal SUMDC_INT_FLT 52 having (i) a DC offset 54 with respect to VREFL 30 for the EFM on-track data; (ii) the mirror signal 56; and (iii) definitive positive 58 and negative 60 voltage level transitions for respective interrupt 44 and defect 42 regions, respectively. The signal profile of the filtered signal (SUMDC_INT_FLT) 52 can be appreciated with reference to FIG. 2b. The filtered signal (SUMDC_INT_FLT) 52 therefore provides a DC level for the RF signal 32 about which DC level the mirror oscillates. As will be understood, residual RF may appear on the filtered signal 52, although this is dependent upon the setting of the cut-off of the low pass filter 50. The amplitude of the oscillating mirror signal is adjusted by setting of the gain control signal (SDCGain) 28, with the gain selected to provide a peak-to-trough variation that is discernible from the DC offset 54 and the transitions associated with interrupts 44 and defects 42.

Following low pass filtering, the filtered signal (SUMDC_INT_FLT) 52 is preferably applied to two distinct circuit paths, namely a first path associated with mirror extraction and a second path dedicated to defect detection. Regarding the mirror path, the filtered signal (SUMDC_INT_FLT) 52 is applied both to a mirror averaging circuit 70 and directly to an inverting input of a mirror amplifier 72. A non-inverting input of the mirror amplifier 72 receives a mirror averaged signal 74 from the mirror average circuit 70. The mirror averaging circuit 70 operates to attain an average DC level for the RF envelope 34 during on-track data recovery and further operates to hold (such as in local memory 76 associated with a voltage DAC or by way of charge on a capacitor) the average DC level during periods of track seeking or track jumping.

The mirror averaging circuit is therefore operationally responsive to a system flag (NHOLD) 78 that is set to be indicative of whether the optical device is on-track jump/seek or on-track mode. Essentially, therefore, NHOLD 78 reflects operation of servos 80 associated with the control of the head assembly 14 and reflects, for example, the duration of a track seek operation.

Regarding the mirror amplifier 72, during on-track operation, an output signal from the mirror amplifier (RFRP) 82 is an inverted version of the filtered signal (SUMDC_INT_FLT) 52. The mirror amplifier 72 preferably has a dynamically programmable gain (MIRGAIN) 84, with the mirror amplifier 72 operating relative to a DC mirror re-bias level 86 that is crafted to sit very near a maximum ADC range associated with servo control. The mirror re-bias level is also set for the operating range of subsequent top-hold and bottom-hold circuits. The DC mirror re-bias level 86 may be varied to alter the RFRP signal 82 and hence may optimize system performance having regard to variation in the RF envelope 34. The ADC range therefore defines the re-biased dark level (VREFL) reference signal 30 and the DC mirror re-bias level 86 to provide an optimum operating range and such that the RFRP (read frequency reference pointer) signal 82 lies within the range of the RF envelope 34. Consequently, during on-track operation, the RFRP signal 82 substantially sits at the mirror re-bias level 86 and, through signal inversion, the mirror signal swings below the mirror re-bias level 86, as seen in FIG. 2c. As will be appreciated, the amplitude of the RFRP signal 82 is a function of the mirror gain and the gain control signal (SDCGain) 28.

Regarding an interrupt, the signal inversion experienced by the RFRP signal 82 generally causes a voltage representative of the interrupt 44 to deflect to a level 88 significantly below the level experienced in the sinusoidal mirror signal oscillation 90. Conversely, each defect results in the RFRP signal 82 peaking at a maximum level 92 above an upper threshold (e.g., the mirror re-bias level during on-track mode) of the sinusoidal mirror signal oscillation 90.

In summary, when on-track, with inputs to the mirror averaging circuit 72 being effectively equal, the RFRP signal 82 sits at the DC mirror re-bias level 86. However, during track seek or jump, the level of the mirror averaging circuit is held so that mirror modulation is seen as a swing below the mirror re-bias level 86.

Also shown in relation to the waveform of the RFRP signal 82 of FIG. 2c is a selectable slice level (or mirror threshold) 94 about which the sinusoidal mirror signal fluctuates. The slice level 94 is therefore used to determine track transition through mirror signal transition through the slice level 94. More particularly, as can be seen in FIG. 1, the signal RFRP 82 is top and bottom held (respectively in top-hold 96 and bottom-hold 98 digital to analog (DACs) converters). By combining the top-hold and bottom-hold threshold levels in, for example, a divide-by-2 circuit, an output from the (exemplary) divide-by-2 circuit is applied to an inverting input of mirror comparator (MirCmp) circuit 102. While the divide-by-two circuit suggests a logic circuit implementation, it is equally feasible to use a potential divider network that defines a voltage somewhere between $V_{top}$ and $V_{bottom}$. For example, using the potential divider network, the slice level 94 could be:

$$V_{THRESHOLD} = V_{BOTTOM} + \left(\frac{V_{TOP} - V_{BOTTOM}}{2}\right).$$

The mirror comparator circuit 102 is arranged to slice (e.g., sample) the RFRP signal 92 that is applied to its non-inverting input to generate the mirror signal 104, as seen in FIG. 2d.

As can be seen in FIG. 2d, according to the present invention, level transitions caused by the interrupt 44 (e.g., region of maximum reflectivity) through the slice level 94 generate a pulse 105 in the mirror signal 104 during on-track operation, with the on-track mode determined by the NHOLD signal 78. A defect, however, does not experience any level transition through the slice level 94 and so does not generate any pulse in the mirror signal 104. Therefore, according to the present invention, a logical combining (such as in an AND gate 118) of the NHOLD signal 78 with the mirror signal will produce an identifiable interrupt pulse 110 during on-track operation. The interrupt pulse 110 is therefore indicative of an interrupt in the optical media. The interrupt pulse may be used by a controller 120 (such as a microprocessor) to set an interrupt flag and suspend, as desired, selected system functionality 122. Signal processing in the optical device (12 of FIG. 1) is therefore geared to identify the interrupt or interrupt flag and to react accordingly by suspending, for example, certain data recovery and timing functions. The present invention may make use of the fact that, if the system is on-track, the mirror pulses are not expected. Consequently, unexpected detection of mirror pulses is entirely indicative of the presence of highly reflective interrupt regions.

Regarding the second path from the low pass filter 50, the filter signal (SUMDC_INT_FLT) 52 is both top held in defect top hold DAC 130 and applied directly to a defect comparator (DftCmp) 132 arranged to provide a defect pulse 134. As a second input, the defect comparator 132 receives a defect threshold signal 136. The defect threshold signal 136 is derived from a held output 138 from the top hold DAC 130 and the re-biased dark level (VREFL) reference signal 30, with the defect threshold signal 136 and the VREFL signal 30 applied to a weighted averaging circuit 140 designed to provide a suitable threshold reference level (reference 144 of FIG. 2b) to differentiate defects from the mirror signal 104. The top hold output may be subject to a long decay time constant such that the value is maintained during a defect in order to maintain the slice threshold level. In contrast with the signal RFRP 82, there is generally no inversion of the filtered signal (e.g., SUMDC_INT_FLT) 52, thereby ensuring that a positive and detectable level transition associated with a dark level defect is detectable. Of course, the reason for using the top-hold DAC 130 is simply to provide a relative reference, and so a bottom-hold DAC should be substituted, albeit that operation of the weighted averaging circuit 140 would need to be modified to ensure that the defect threshold signal 136 was set to an appropriate level. The weighted average circuit 140 again suggests a digital implementation, although the circuit 140 can be readily (and preferably) substituted by a potential divider network arranged to provide the threshold level 144.

A mirror averaging function and mirror amplifier suitable for implementation in the present invention is described in co-pending UK patent application 0029121.1 filed in the name of LSI Logic Europe Limited on Nov. 29, 2000 and titled "APPARATUS AND METHOD FOR PROVIDING A MIRROR AVERAGER FUNCTION TO GENERATE A MIRROR SIGNAL FROM OPTICAL DATA ON AN OPTICAL DISC", which is hereby incorporated by reference.

Figure 4:
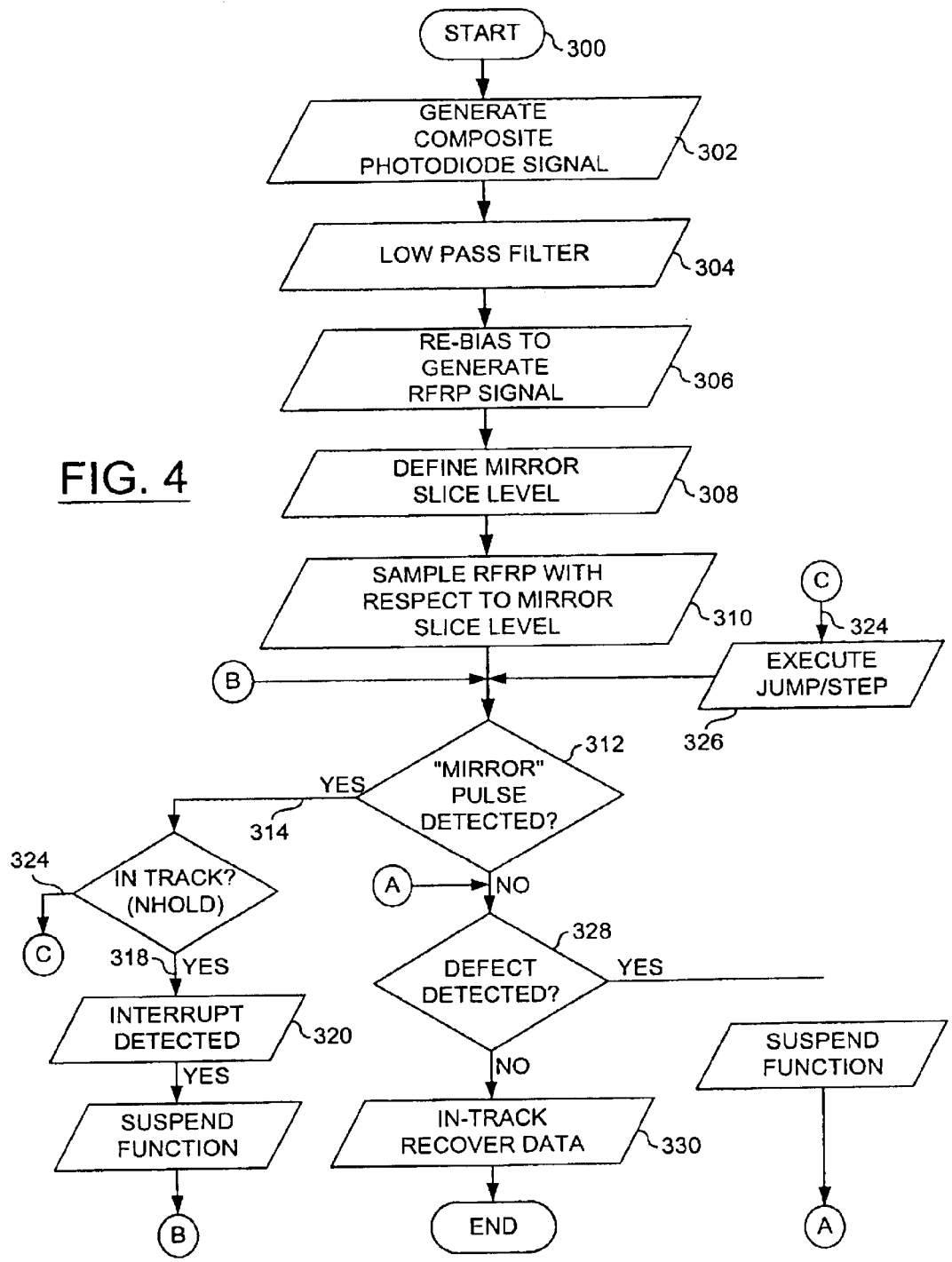
FIG. 4 is a flow diagram of a preferred operating methodology employed by an optical media device to address interrupts and defects in an optical media.

Referring to FIG. 4, the principal functions performed by the mechanism employed by the present invention are shown. Starting the process at step 300, a composite photodiode signal is produced 302, which is generally low pass filtered 304. Re-biasing 306 of the low pass filtered representation generates the signal RFRP, from which the mirror (threshold) slice level is derived 308 (e.g. through a top and bottom hold averaging function). The signal RFRP is sampled 310 with the mirror slice level. The circuitry and logic then indiscriminately look 312 for the detection of pulses which could be produced by either mirror modulation or interrupts. If mirror pulses are detected 314, then an assessment 316 of whether the device is operating in an on-track mode is made. In the affirmative 318, an interrupt is declared 320 and system operation is at least partially suspended 322. In the negative (i.e. bona fide mirror modulation detected) 324, the track skip/jump is executed/performed. Once the skip/jump has been completed (as assessed by mirror modulation count or the absence of the mirror signal), then the data recovery process can continue through, for example, step 312 and beyond. If there are no mirror pulses (negative path 326 from block 312), then the system looks to whether any defects have been registered 328. If there is no defect, then data recovery 330 occurs, otherwise at least one system function is suspended 332 for the duration of the defect.

As long as the DVD player (or the like) is operational, the process of FIG. 4 operates in a continuous loop. It will, of course, be appreciated, that the process of FIG. 4 is both exemplary and truncated in its detail. Indeed, strict compliance with the ordering and execution of the various process steps of FIG. 4 is therefore not essential for the successful performance of the present invention.

Figure 3:
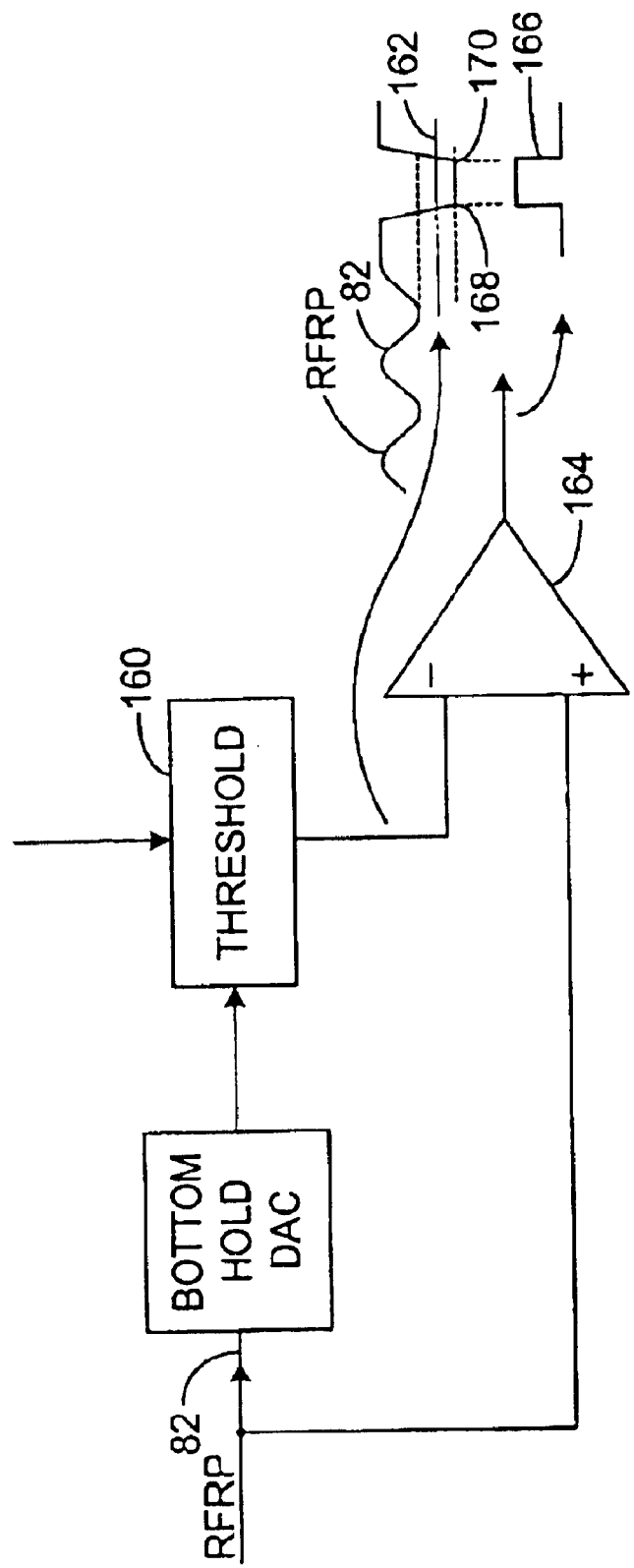
FIG. 3 is a schematic block diagram of an interrupt detector in accordance with another embodiment of the present invention that may be used in complement with FIG. 1.

In another embodiment of the present invention, a difference in modulation of the signal SUMDC_INT (of FIG. 2a) between mirror and interrupt aspects is detected. However, as mirror modulations of the RF data can be up to 90% of the total available envelope, this new threshold would have to be defined in the remaining 10% band. As can be seen in FIG. 2a, interrupts cause 100% modulation of the envelope. Advantageously, this solution does have the advantage of being able to distinguish between interrupt regions and mirror regions that occur during seeking. Regarding circuit implementation, reference is made to FIG. 3. A further threshold generator 160 sets a modulation threshold level 162 below the sinusoidal modulation of the mirror of the signal RFRP 82 and provides this modulation threshold level 162 as a control input to a further comparator 164. The further comparator 164 also receives the signal RFRP 82, with a pulse output 166 therefore occurring only when interrupt events cause transitions 168 and 170 through the modulation threshold level 162. Accurate setting of the modulation threshold level 162 is such that oscillation of the sinusoidal mirror component of the RFRP signal 82 never transitions through the threshold. Of course, various combinations of signals may be used to set the modulation threshold level, including the composite signal SUMDC_INT_FLT 52, with the above example illustrative of the underlying principle.

Alternative embodiments of the invention may be implemented as computer program code encoded on a computer program product for use with a computer system. It is expected that such a computer program product may be distributed as a removable medium with accompanying printed or electronic documentation (e.g., shrink-wrapped software), preloaded with a computer system or distributed from a server or electronic bulletin board over a network (e.g., the Internet or World Wide Web). A series of computer instructions can therefore either be fixed on a tangible medium or fixed in a computer data signal embodied in a carrier wave that is transmittable to a computer system using wireline or wireless transmission techniques. The removable (i.e., tangible) medium may be a computer readable media, such as a diskette, CD-ROM, DVD-ROM or RAM, fixed disc, magneto-optical discs, ROMs, flash memory or magnetic or optical cards. The series of computer instructions embodies all or part of the functionality previously described herein with respect to the system.

Software embodiments of the invention may be implemented in any conventional computer programming language. For example, preferred embodiments may be implemented in a procedural programming language (e.g., "C") or an object oriented programming language (e.g., "C++").

Although the preferred operating method is realized by general or specific-purpose processor or logic circuits programmed with suitable machine-executable instructions, hardware components may possibly be used to implement certain features of the present invention. Of course, the present invention may be performed by a combination of hardware and software.

It will, of course, be appreciated that the above description has been given by way of example only and that modifications in detail may be made within the scope of are the present invention. For example, while the present invention uses the NHOLD signal to extract interrupt from an otherwise indistinguishable mass of mirror pulses, other indications of track seek or track jump operation could be used to distinguish interrupt regions; these will be readily appreciated by the skilled addressee. Furthermore, while the logical combining of the preferred embodiment utilizes an AND gate structure, alternative logical functions and gates can be substituted therefor.

What is claimed is:

1. A method of determining interrupts in data on an optical disc, the data supported in a signal envelope subject to variation by mirror modulation and said interrupts, comprising the steps of:
(A) filtering the signal envelope to generate a first signal;
(B) re-biasing the first signal to produce an intermediate signal having voltage swings attributable to the mirror modulation;
(C) defining a slice level below a reference level to sample the mirror modulation to produce a mirror signal;
(D) slicing the intermediate signal to generate the mirror signal containing a pulse resulting from a level transition through the slice level associated with re-biasing of the positive transition component; and
(E) registering the presence of the pulse during the on-track mode of operation to identify the interrupt in data on the optical disc.

2. The method of claim 1, wherein the first signal comprises:
   a DC offset component representative of on-track data;
   an oscillation component representative of the mirror modulation, the oscillation component providing variations in level from the DC offset component; and
   a positive transition component relative to the DC offset component, the positive transition component attributable to an interrupt.

3. The method of claim 1, wherein step (B) comprises:
   re-biasing when said interrupts are below a reference level associated with said DC offset component.

4. The method of claim 1, further comprising:
   (F) setting an operational flag indicative of one of the on-track mode of operation and a jump/seek mode of operation; and
   (G) logically combining the operational flag with the mirror signal to generate an interrupt pulse.

5. The method of claim 1, further comprising:
   suspending at least one system function of an optical media device in response to identification of the presence of the interrupt.

6. The method of claim 1, further comprising:
   holding an averaged DC level for the signal envelope during periods of track seeking and track jumping, the averaged DC level being the DC offset component.

7. The method of claim 1, further comprising:
   applying the first signal to an amplifier having a variable gain;
   applying the DC offset component to the amplifier; and
   dynamically varying the gain of the amplifier relative to a DC mirror re-bias level to produce the intermediate signal.

8. The method of claim 1, wherein the DC offset component is representative of the on-track data region and the DC offset component is relative to a re-biased dark level.

9. The method of claim 8 when dependent upon claim 8, wherein the re-biased dark level and the DC mirror re-bias level are indicative of an operating range of an analog to digital converter (ADC).

10. The method of claim 9, wherein the intermediate signal, during on-track operation, substantially sits at the DC mirror re-bias level.

11. A method of suspending system operation in optical disc equipment during periods of substantially maximum reflectivity in an optical disc, the method comprising the steps of:
   (A) during periods of substantially maximum reflectivity, generating a pulse;
   (B) associating any pulse generated during periods of on-track operation with a corruption in data recovery caused by an interrupt;
   (C) suspending at least one operational function in the optical disc equipment in response to the interrupt;
   (D) generating a first signal level associated with data recovery during on-track operation;
   (E) generating an oscillation signal having a varying signal level relative to the first signal level during track transition across adjacent tracks of the optical disc; and
   (F) generating the pulse in response to a signal level displacement relative to the first signal level, the signal level displacement being greater than the varying signal level of the oscillation signal.

12. The method of claim 11, wherein the signal level displacement has a greater magnitude than a peak-to-peak magnitude of the oscillation signal.

13. The method of claim 11, wherein the interrupt causes a negative deflection to a level significantly below a minimum level experienced in the oscillation signal.

14. An apparatus arranged to determine interrupts in data on an optical disc, the data being supported in a signal envelope that is subject to variation by mirror modulation and said interrupts, the apparatus comprising:
   a filter configured to provide a first signal comprising (i) a DC offset component representative of on-track data, (ii) an oscillation component representative of the mirror modulation, the oscillation component providing variations in level from the DC offset component, and (iii) a positive transition component relative to the DC offset component, the positive transition component attributable to an interrupt, in response to responsive signal envelope;
   a differential amplifier coupled to the filter and configured to re-bias the first signal in order to generate an intermediate signal in which voltage swings attributable to the mirror modulation and said interrupts are below a reference level associated with the DC offset component; and
   a processor configured to identify the interrupt in data on the optical disc in response to on-track operation of the apparatus and receipt of the pulse.

15. The apparatus according to claim 14, further comprising:
   a slicing circuit coupled to the differential amplifier and configured to have a slice level below the reference level, the slicing circuit sampling the mirror modulation to produce a mirror signal.

16. The apparatus according to claim 14, further comprising:
   a comparator coupled to the filter and arranged to slice the intermediate signal with respect to the slice level to generate, over time and during on-track operation, a pulse resulting from a level transition through the slice level associated with re-biasing of the positive transition component.

17. The apparatus according to claim 14, wherein the processor includes an operational flag indicative of one of the on-track mode of operation and a jump/seek mode of operation and the apparatus further includes:
   a logic circuit configured to combine the operational flag with the mirror signal to generate an interrupt pulse.

18. The apparatus according to claim 14, wherein the processor, in response to identification of a presence of the interrupt, is arranged to suspend at least one system function of an optical media device.

19. The apparatus according to any of claim 14, wherein the differential amplifier has a variable gain and has a first input response to the first signal and a second input responsive to the DC offset component, the differential amplifier operational dynamically to vary the gain relative to a DC mirror re-bias level to produce the intermediate signal.

* * * * *